United States Patent
Lotem et al.

(10) Patent No.: US 9,507,944 B2
(45) Date of Patent: *Nov. 29, 2016

(54) METHOD FOR SIMULATION AIDED SECURITY EVENT MANAGEMENT

(71) Applicant: SKYBOX SECURITY INC., San Jose, CA (US)

(72) Inventors: Amnon Lotem, Ramot Hashavim (IL); Gideon Cohen, Palo Alto, CA (US); Lior Ben Naon, Nes Ziona (IL)

(73) Assignee: SKYBOX SECURITY INC., San Jose, CA (US)

( * ) Notice: Subject to any disclaimer, the term of this patent is extended or adjusted under 35 U.S.C. 154(b) by 382 days.

This patent is subject to a terminal disclaimer.

(21) Appl. No.: 13/847,533

(22) Filed: Mar. 20, 2013

(65) Prior Publication Data

US 2013/0312101 A1 Nov. 21, 2013

Related U.S. Application Data

(63) Continuation of application No. 12/206,076, filed on Sep. 8, 2008, now Pat. No. 8,407,798.

(60) Provisional application No. 60/970,999, filed on Sep. 10, 2007.

(51) Int. Cl.
*G06F 21/57* (2013.01)
*G06F 21/55* (2013.01)
*H04L 29/06* (2006.01)

(52) U.S. Cl.
CPC ............ *G06F 21/577* (2013.01); *G06F 21/55* (2013.01); *H04L 63/1433* (2013.01)

(58) Field of Classification Search
CPC combination set(s) only.
See application file for complete search history.

(56) References Cited

U.S. PATENT DOCUMENTS

| | | |
|---|---|---|
| 4,773,028 A | 9/1988 | Tallman |
| 5,032,979 A | 7/1991 | Hecht et al. |
| 5,278,901 A | 1/1994 | Shieh |
| 5,295,230 A | 3/1994 | Kung |

(Continued)

FOREIGN PATENT DOCUMENTS

| | | |
|---|---|---|
| EP | 896285 | 2/1999 |
| WO | WO0070463 | 11/2000 |

(Continued)

OTHER PUBLICATIONS

Swiler, Laura Painton, Cynthia Phillips, Sandia National Laboratories, Timothy Gaylor, A Graph-Based Network Vulnerability Analysis System, SAND97-3010/1, Jan. 1998.

(Continued)

*Primary Examiner* — Taghi Arani
*Assistant Examiner* — Phy Anh Vu
(74) *Attorney, Agent, or Firm* — Reches Patents

(57) ABSTRACT

A method for simulation aided security event management, the method comprises: generating attack simulation information that comprises multiple simulation data items of at least one data item type out of vulnerability instances data items, attack step data items and attack simulation scope data items; wherein the generating of attack simulation information is responsive to a network model, at least one attack starting point and attack action information; identifying security events in response to a correlation between simulation data items and event data; and prioritizing identified security events.

18 Claims, 7 Drawing Sheets

(56) References Cited

U.S. PATENT DOCUMENTS

| | | |
|---|---|---|
| 5,361,359 A | 11/1994 | Tajalli et al. |
| 5,475,625 A | 12/1995 | Glaschick |
| 5,485,409 A | 1/1996 | Gupta |
| 5,557,742 A | 9/1996 | Smaha |
| 5,621,889 A | 4/1997 | Lermuzeaux et al. |
| 5,675,711 A | 10/1997 | Kephart et al. |
| 5,796,942 A | 8/1998 | Esbensen |
| 5,812,763 A | 9/1998 | Teng |
| 5,819,094 A | 10/1998 | Sato |
| 5,850,516 A | 12/1998 | Schneier |
| 5,892,903 A | 4/1999 | Klaus |
| 5,923,849 A | 7/1999 | Venkatraman |
| 5,926,463 A | 7/1999 | Ahearn et al. |
| 5,931,946 A | 8/1999 | Terada et al. |
| 5,958,010 A | 9/1999 | Agarwal et al. |
| 5,991,881 A | 11/1999 | Conklin |
| 6,016,546 A | 1/2000 | Kephart et al. |
| 6,070,244 A | 5/2000 | Orchier et al. |
| 6,088,804 A * | 7/2000 | Hill et al. ................. 726/25 |
| 6,134,664 A | 10/2000 | Walker |
| 6,185,689 B1 | 2/2001 | Todd, Sr. et al. |
| 6,205,552 B1 | 3/2001 | Fudge |
| 6,212,558 B1 | 4/2001 | Antur et al. |
| 6,253,337 B1 | 6/2001 | Maloney et al. |
| 6,275,942 B1 | 8/2001 | Bernhard et al. |
| 6,282,546 B1 | 8/2001 | Gleichauf |
| 6,295,607 B1 | 9/2001 | Johnson |
| 6,298,445 B1 | 10/2001 | Shostack |
| 6,301,613 B1 | 10/2001 | Ahlstrom |
| 6,301,668 B1 | 10/2001 | Gleichauf et al. |
| 6,301,699 B1 | 10/2001 | Hollander et al. |
| 6,324,656 B1 | 11/2001 | Gleichauf et al. |
| 6,415,321 B1 | 7/2002 | Gleichauf et al. |
| 6,535,227 B1 | 3/2003 | Fox et al. |
| 6,546,493 B1 | 4/2003 | Magdych et al. |
| 6,704,873 B1 | 3/2004 | Underwood |
| 6,735,702 B1 | 5/2004 | Yavatkar |
| 6,895,383 B2 | 5/2005 | Heinrich |
| 6,952,779 B1 * | 10/2005 | Cohen et al. ................. 726/22 |
| 6,968,377 B1 | 11/2005 | Gleichauf et al. |
| 6,988,208 B2 | 1/2006 | Hrabik et al. |
| 7,010,696 B1 | 3/2006 | Cambridge et al. |
| 7,013,395 B1 * | 3/2006 | Swiler ................. H04L 63/1433 |
| | | 713/151 |
| 7,016,499 B2 | 3/2006 | Perlman |
| 7,016,980 B1 | 3/2006 | Mayer et al. |
| 7,055,107 B1 | 5/2006 | Rappaport et al. |
| 7,058,821 B1 | 6/2006 | Parekh et al. |
| 7,089,303 B2 | 8/2006 | Sheymov |
| 7,096,502 B1 | 8/2006 | Fox et al. |
| 7,107,619 B2 | 9/2006 | Silverman |
| 7,222,366 B2 | 5/2007 | Bruton, III et al. |
| 7,293,287 B2 | 11/2007 | Fischman |
| 7,293,290 B2 | 11/2007 | Szor |
| 7,296,274 B2 * | 11/2007 | Cohen ................. G06F 21/55 |
| | | 713/182 |
| 7,305,709 B1 | 12/2007 | Lymer |
| 7,325,252 B2 | 1/2008 | Bunker et al. |
| 7,340,776 B2 | 3/2008 | Zobel et al. |
| 7,342,893 B2 | 3/2008 | Barkai |
| 7,359,962 B2 | 4/2008 | Willebeek-LeMair et al. |
| 7,373,664 B2 | 5/2008 | Kissel |
| 7,373,667 B1 | 5/2008 | Millard |
| 7,409,720 B1 | 8/2008 | Cambridge et al. |
| 7,454,791 B1 | 11/2008 | Godwin |
| 7,472,421 B2 | 12/2008 | Cummins |
| 7,509,680 B1 | 3/2009 | Sallam |
| 7,530,104 B1 | 5/2009 | Thrower |
| 7,530,105 B2 | 5/2009 | Gilbert et al. |
| 7,530,106 B1 | 5/2009 | Zaitsev et al. |
| 7,552,480 B1 | 6/2009 | Voss |
| 7,574,740 B1 | 8/2009 | Kennis |
| 7,603,711 B2 | 10/2009 | Scheidell |
| 7,603,715 B2 | 10/2009 | Costa et al. |
| 7,607,170 B2 | 10/2009 | Chesla |
| 7,624,447 B1 | 11/2009 | Horowitz et al. |
| 7,624,450 B1 | 11/2009 | Lymer |
| 7,664,845 B2 | 2/2010 | Kurtz et al. |
| 7,673,043 B2 | 3/2010 | Keir |
| 7,681,235 B2 | 3/2010 | Chesla et al. |
| 7,712,136 B2 | 5/2010 | Sprosts et al. |
| 7,712,138 B2 | 5/2010 | Zobel et al. |
| 7,743,421 B2 | 6/2010 | Cosquer et al. |
| 7,765,283 B2 | 7/2010 | Noy |
| 7,779,467 B2 | 8/2010 | Choi et al. |
| 7,845,007 B1 | 11/2010 | Kennis |
| 7,865,956 B1 | 1/2011 | Cambridge et al. |
| 7,895,448 B1 | 2/2011 | Satish |
| 7,971,256 B2 | 6/2011 | Bhikkaji et al. |
| 8,117,654 B2 | 2/2012 | Jung et al. |
| 8,171,553 B2 | 5/2012 | Aziz |
| 8,201,257 B1 | 6/2012 | Andres et al. |
| 8,272,061 B1 * | 9/2012 | Lotem ................. G06F 21/577 |
| | | 709/223 |
| 8,407,798 B1 * | 3/2013 | Lotem ................. G06F 21/55 |
| | | 726/18 |
| 2002/0059078 A1 | 5/2002 | Valdes et al. |
| 2003/0009690 A1 | 1/2003 | Grupe |
| 2003/0009696 A1 | 1/2003 | Bunker et al. |
| 2003/0051049 A1 | 3/2003 | Noy et al. |
| 2003/0110396 A1 | 6/2003 | Lewis et al. |
| 2003/0195861 A1 | 10/2003 | McClure et al. |
| 2003/0204632 A1 | 10/2003 | Willebeek-LeMair et al. |
| 2004/0006704 A1 * | 1/2004 | Dahlstrom ............ G06F 21/577 |
| | | 726/25 |
| 2004/0030931 A1 * | 2/2004 | Chamandy ........ H04L 29/12009 |
| | | 726/11 |
| 2004/0111632 A1 | 6/2004 | Halperin |
| 2004/0128543 A1 | 7/2004 | Blake et al. |
| 2005/0021740 A1 | 1/2005 | Bar |
| 2005/0091533 A1 | 4/2005 | Omote |
| 2005/0114678 A1 | 5/2005 | Bagga et al. |
| 2005/0193430 A1 | 9/2005 | Cohen et al. |
| 2006/0010389 A1 | 1/2006 | Rooney et al. |
| 2006/0021047 A1 * | 1/2006 | Cook ................. 726/25 |
| 2006/0021049 A1 * | 1/2006 | Cook ................. 726/25 |
| 2006/0021050 A1 | 1/2006 | Cook et al. |
| 2006/0095970 A1 | 5/2006 | Rajagopal |
| 2006/0218640 A1 | 9/2006 | Lotem et al. |
| 2006/0291490 A1 | 12/2006 | Omote et al. |
| 2007/0067842 A1 | 3/2007 | Greene et al. |
| 2007/0083929 A1 | 4/2007 | Sprosts et al. |
| 2007/0083931 A1 | 4/2007 | Spiegel et al. |
| 2007/0094730 A1 | 4/2007 | Bhikkaji |
| 2007/0220606 A1 | 9/2007 | Omote |
| 2008/0052054 A1 | 2/2008 | Beverina |
| 2008/0098479 A1 * | 4/2008 | O'Rourke et al. ............. 726/25 |
| 2009/0016244 A1 | 1/2009 | Sharma |
| 2010/0115618 A1 | 5/2010 | Lee et al. |
| 2011/0191847 A1 | 8/2011 | Davis et al. |

FOREIGN PATENT DOCUMENTS

| | | |
|---|---|---|
| WO | WO02062049 | 8/2002 |
| WO | WO2004031953 | 4/2004 |

OTHER PUBLICATIONS

Distributed scan model for Enterprise-Wide Network Vulnerability Assessment; SANS Institute InfoSec Reading Room, 2002.

Modeling and characterizing parallel computing performance on heterogeneous networks of workstations; Xiaodong Zhang, Yong Yan; 1995.

Phillips, Cynthia, et al.; "A Preliminary Classification Scheme for Information System Threats, Attacks and Defenses; A Cause and Effect Model; and Some Analysis Based on that Model", Sandia National Laboratories, Sep. 1998, pp. 1-78.

Kindred Darrell et al.; "Fast, Automatic Checking of Security Protocols"; pp. 1-19.

Wing Jeannette M. et al.; "Survivability Analysis of Networked Systems", Computer Science Dept., Carnegie Mellon Univ., Pittsburgh, PA; Information and Communications Univ., Taejon, Korea; May 14, 2001; pp. 1-31.

(56) References Cited

OTHER PUBLICATIONS

Wyss Gregory D. et al.; "Information Systems Vulnerability: A Systems Analysis Perspective", Sandia National Laboratories, pp. 1-14.
Jha Somesh; "Survivability Analysis of Software Specifications", Department of Mathmatics, University of Illinois at Urbana-Champaign, Abstract.
Oleg Sheyner et al.; "Toward Compositional Analysis of Security Protocols Using Theorem Proving", School of Computer Science, CarnegieMellon Univ., Jan. 200, pp. 1-28.
Jha Somesh et al.; "Minimization and Reliability Analyses of Attack Graphs", School of Computer Science, Carnegie Mellon University, pp. 1-30.
Wing Jeannete M.; "Survivability Analysis of Networked Systems", Carnegie Mallon University, Abstract; van Lamsweerde Axel; "Building Formal Models for Software Requirements", Universite Catholique de Louvain, Abstract.
Deswarte Yves et al.; "Experimental Validation of a Security Metrics", LAAS-CNRS, pp. 1-6.
Mummidi Sailaja et al.; "Information Management System Vulnerability Analysis Study", New Mexico Tech., Nov. 8, 2001, pp. 1-16. http://www/naseo.org/committees/energy data/energy assurance/, pp.1-2.
Hutchinson Bob et al.; "Lessons Learned Through Sandia's Cyber Assessment Program", Sandi National Laboratories, pp. 1-17.
Swiler LP et al.; "Computer-Attack Graph Generation Tool", Darpa Information Aurvivability Conference & Exposition II, 2001, Disc Ex '01, Proceedings Jun. 12-14, 2001, Piscataway, New Jersey, USA pp 307-321.
Sheyner O et al.; "Automated Generation and Analysis of Attack Graphs"; Proceedings 2002 IEEE Symposium on Security and Privacy May 12-15, 2002; Berkeley CA, USA; pp. 273-284.
Skybox Security, Ltd.; EP Application No. 03759635.0 Supplementary European Search Report; Sep. 15, 2008.
Representing TCP/IP connectivity for topological analysis of network seciruty; Ronald Ritchey et al.; 2002.
Network Security Monitor; Jun. 6, 1991; L. Todd Heberlein.

* cited by examiner 710 obtaining event data indicative of a security event identified by a security event manager 722 defining field based correlation rules and specific simulated event correlation rules, based upon an outcome of an attack simulation 720 defining correlation rules based upon an outcome of an attack simulation 730 identifying security events in response to a correlation between correlation rules and event data

600          FIG. 7

METHOD FOR SIMULATION AIDED SECURITY EVENT MANAGEMENT

RELATED APPLICATIONS

This application is a continuation of U.S. patent application Ser. No. 12/206,076 filing date Sep. 8, 2008 which claims priority from U.S. provisional patent application Ser. No. 60/970,999 filing date 10 Sep. 2007—both applications are incorporated herein by reference.

FIELD OF THE INVENTION

Simulation aided security event management method and computer program product.

BACKGROUND

Security Event Managers (SEMs) provide a security monitoring solution for enterprises which is based on collecting data on events in the network from various sources, analyzing and correlating the events to identify security events. The SEM reports the security events it identifies or provides an automatic response to them. SEMs are also referred to as Security Information Mangers (SIMs), or Security Information and Event Managers (SIEMs).

SEM data sources might include intrusion detection and prevention (IDP) systems, firewalls, security applications, operating systems, logs of network devices, and more.

SEM has to cope with a large amount of raw data and alerts generated by network devices, security mechanisms, and hosts.

Some of the challenges that SEMs and SEM users experience are: (a) A high rate of false-positive security alerts; (b) Non effective enough prioritization of the security events; (c) A complex set of rules which has to be configured manually in order to govern the event correlation and reporting; (d) Limited contextual information for assisting security analysts in handling security events identified by the SEM.

SUMMARY OF THE INVENTION

A method for simulation aided security event management, the method comprises: generating attack simulation information that comprises multiple simulation data items of at least one data item type out of vulnerability instances data items, attack step data items and attack simulation scope data items; wherein the generating of attack simulation information is responsive to a network model, at least one attack starting point and attack action information; identifying security events in response to a correlation between simulation data items and event data; and prioritizing identified security events.

The method may include generating, by a first computer, attack simulation information; and identifying security events, by a second computer, in response to the attack simulation information and to actual network event information.

The method may include determining a correlation between a simulation data item and event data by comparing between key fields of the simulation data item and corresponding key fields of the event data.

The method may include defining field based correlation rules and specific simulated event correlation rules; and applying the correlation rules and specific simulated event correlation rules during the identifying of the security events.

The method may include determining a confidence of identified events, prioritizing identified events that have a confidence level that is above a confidence threshold while ignoring identified events that have a confidence level that is below the confidence threshold.

The method may include assigning a first confidence level to an identified event that is associated with a directly exposed vulnerability; assigning a second confidence level to an identified event that is associated with an indirectly exposed vulnerability; and assigning a third confidence level to an identified event that is associated with an inaccessible vulnerability; wherein the second confidence level is lower than the first confidence level and higher than the third confidence level.

The method may include obtaining network address translation information and applying the network translation information during correlating between IP addresses appear in simulation data items and events.

The method may include the automatically generating rules for the SEM, where the rules represent attack simulation knowledge.

The method may include generation rules for the SEM for identifying exploitation of vulnerabilities that were found by the attack simulation to be risky enough.

The method may include generation rules for SEM might include in the generated rule details from attack steps in the simulation that exploit the vulnerability: the IP address of the target node, the target port, and optionally the source of the attack steps.

A method for simulation aided security event management, the method may include generating a new attack starting point or updating an existing attack starting point in response to an identified security event that has a priority that exceeds a priority threshold; running an attack simulation which is based on a network model using the new attack starting point; and analyzing the risk and extracting contextual information.

The method may include extracting contextual information that relates to the next possible attack steps of the attacker from the event target node.

The method may include extracting contextual information that relates to the next possible attack steps of the attacker from the event source node.

The method may include extracting contextual information that relates to the security counter-measures that can be used for blocking the possible next attack steps.

A non-transitory computer readable medium that stores instructions for generating attack simulation information that comprises multiple simulation data items of at least one data item type out of vulnerability instances data items, attack step data items and attack simulation scope data items; wherein the generating of attack simulation information is responsive to a network model, at least one attack starting point and attack action information; identifying security events in response to a correlation between simulation data items and event data; and prioritizing identified security events.

The non-transitory computer readable medium may store instructions for generating, by a first computer, attack simulation information; and identifying security events, by a second computer, in response to the attack simulation information and to actual network event information.

The non-transitory computer readable medium may store instructions for determining a correlation between a simulation data item and event data by comparing between key fields of the simulation data item and corresponding key fields of the event data.

The non-transitory computer readable medium may store instructions for defining field based correlation rules and specific simulated event correlation rules; and applying the correlation rules and specific simulated event correlation rules during the identifying of the security events.

The non-transitory computer readable medium may store instructions for determining a confidence of identified events, prioritizing identified events that have a confidence level that is above a confidence threshold while ignoring identified events that have a confidence level that is below the confidence threshold.

A non-transitory computer readable medium may store instructions for generating a new attack starting point or updating an existing attack starting point in response to an identified security event that has a priority that exceeds a priority threshold; running an attack simulation which is based on a network model using the new attack starting point; and analyzing the risk and extracting contextual information.

BRIEF DESCRIPTION OF THE DRAWINGS

The invention is illustrated in the figures of the accompanying drawings which are meant to be exemplary and not limiting, in which like references are intended to refer to like or corresponding parts and in which:

FIG. 7 is a flow chart of a method according to an embodiment of the invention.

DESCRIPTION OF THE PREFERRED EMBODIMENTS

Figure 1:
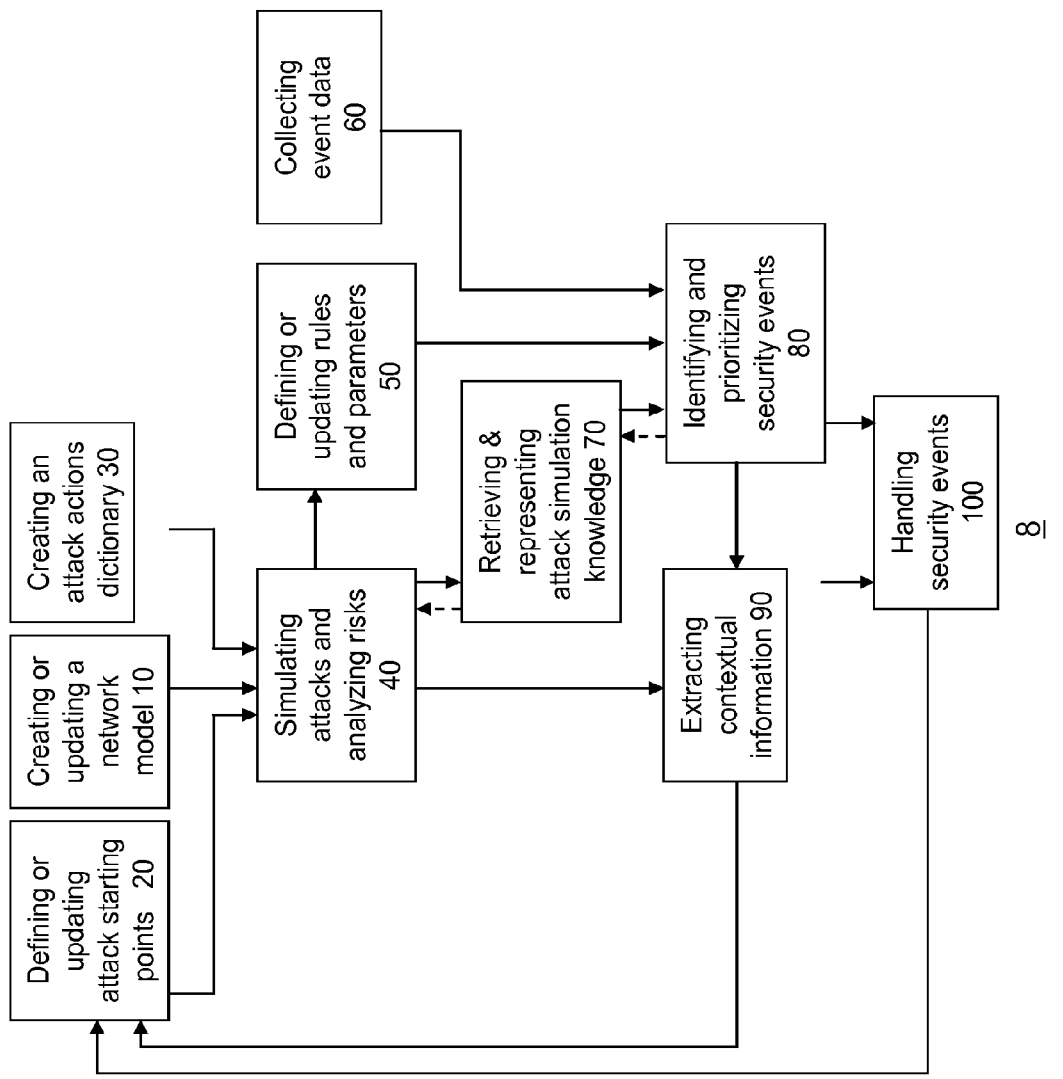
FIG. 1 is a flow chart of a method in accordance with one embodiment of the present invention.

Various embodiments of methods and computer programs according to this invention are described through reference to the figures.

The following are examples and illustrations relating to the terms used herein, and are not intended to be limiting of the scope of such terms. The term "network", as used herein, whether itself or in association with other terms, generally includes or refers to not only a network as a whole, but also any components or aspects thereof, such as network nodes, groups of network nodes, or components or aspects of network nodes, as well as services, applications, hardware, hardware components, software, software components, and the like, associated with the network or any component or aspect thereof, as well as any associated configurations. The term, "network model," and similar terms, as used herein, generally includes a variety of types of information relating to the network or any components or aspects thereof, such as network nodes, and includes configurations of or associated with network devices (firewalls, routers, load balancer, IPS, worm protecting systems, etc.) computers, software, software components, applications, operating systems, and the like, including network services information and network topology information.

Conveniently, a method is provided for improving the overall performance of the security event management process. The method is based on performing attack simulation and risk analysis on a network model, and using these results for improving the SEM results.

Conveniently at least one of the mentioned below methods allows to use attack simulation for filtering and prioritizing security events, where data items are used to represent the attack simulation knowledge (attack simulation information).

Attack simulation is performed using a network model from a certain set of the attack starting points.

The relevant knowledge from the attack simulation is represented in data items that can be correlated with events: (i) The data items might represent vulnerability instances, or more generally, attack steps explored by the attack simulation; (ii) Each data item might include attributes which are related to the vulnerability instance or the attack step it represents such as exposure status, likelihood, and risk; (iii) A data item might include for the source and the target of the attack step both pre NAT and post NAT IP addresses that were used in performing the attack step; (iv) Special data items are generated to represent what was checked by the attack simulation, such as source addresses from which attack steps were examined.

The correlation process of the SEM (for example—the correlation of stage 80) correlates events with the data items to determine security events and prioritize them. The rules which control the correlation process can be augmented to find matches between events and data items that represent attack simulation knowledge and scope. The confidence and the priority of the security events are determined according to attributes of data items correlated with the security event, such as exposure status, likelihood and risk. The matching status with data items which represent what was cheeked by the attack simulation is also considered in determining the confidence and priority of the event.

Conveniently, a security event with high enough confidence might trigger the creation of a new attack starting point for the attack simulation or update the likelihood of initiating attack from an existing attack starting point.

According to an embodiment of the invention attack simulation (and especially attack simulation information) can be used for filtering and prioritizing security events, where queries are used to retrieve the attack simulation knowledge.

Attack simulation is performed using a network model from a certain set of the attack starting points.

A query interface is supported to answer whether a specified action is possible or not according the attack simulation, and what are the likelihood and risk of that action.

When an event of a certain type is identified by the SEM (e.g., an indication for exploitation trial of a vulnerability) a query is submitted to answer if the event corresponds a possible attack step.

The confidence and the priority of the identified event is determined based on the answer to the query and optionally by the likelihood and the risk which were retrieved The attack simulation knowledge is represented in an efficient way to be retrieved by queries, such as an attack graph with relevant indices.

The knowledge includes information on attack steps that can be used in attacks, their likelihoods and risk.

The knowledge also includes the scope of the attack simulation—what was checked by examined by the simulation.

If the queried information has not been computed by the attack simulation it can be invoked with the specific scope indicated in the query.

A security event with high enough confidence might trigger the creation of a new attack starting point for the attack simulation or update the likelihood of initiating attack from an existing attack starting point.

According to an embodiment of the invention attack simulation can be used for configuring and tuning the rules of security event management systems.

Attack simulation is performed from a certain set of the start points. The knowledge extracted by the attack simulation is used for defining rules and parameters of the SEM system. Conveniently, rules are created for identifying events that indicate the actual exploitation of vulnerabilities, or performing attack steps that were found as possible in the attack simulation, and have certain values of attributes. Additionally or alternatively, rules can be created to correlate between the above events and events that indicate a success of the exploitation, including events that indicate continuation attack steps.

The rules can be associated with confidence and priority based on parameters of the attack step they identify or correlates. For example based on exposure, likelihood, or risk.

According to a further embodiment of the invention attack simulation is used for extracting contextual information which assists in handling security events identified by the security event management system. This can include: identifying by the SEM a security event; and the attack simulation can get information on parameters of the event and supplies contextual information on that event which is presented to the operator.

The contextual information might include: (i) What are the next possible steps of the attacker from the current target node, ranked by risk; (ii) What are the next possible steps of the attack from the source node of the attack; or (iii) Which security counter-measures can be used for blocking the possible next attack steps.

The operator of the SEM can use the contextual information for handling the event.

FIG. 1 is a flow chart of method 8 in accordance with one embodiment of the present invention. Method 8 includes stages 10, 20, 30, 40, 50, 60, 70, 80, 90 and 100.

Creating or Updating a Network Model

Stage 10 includes generating (or updating) a network model. The network model is a pre-requisite for the attack simulation.

The network model represents, using software data structures, a required scope of a computer network. The data structures conveniently correspond to networks (also referred to as sub-networks), network nodes ("nodes"), network interfaces of nodes, services installed on the nodes and vulnerabilities identified on these services. The model represents the topology of the network, the nodes and services in the network, and the configurations of the network devices: firewalls, routers, load balancer, IPS (Intrusion Prevention Systems), worm protecting systems, etc.

The model can also represent, in somewhat abstract way: (1) networks which are out of the scope of the model but are connected to entities in the model (e.g., the Internet, or networks of partners), and (2) groups of networks that the knowledge on their nodes and topology is limited (for example, only the range of IP addresses is known).

A network model is typically associated with information on business and information assets, and the expected damage to these assets in case of security loss (such as loss that results from confidentiality, integrity, and availability breaches).

The model also contains information on potential and actual attack starting points (threat origins).

The model can also represent the event collectors (sensors) that are located in the network and feed the SEM system with events. The information on an event collector might include its ID, location, and type of reported events.

A network model can be built by collecting and importing configurations of gateways and protection systems, and getting data on network nodes from various sources such as network and vulnerability scanners, patch management tools, network discovery tools, CMDB, etc.

Information on Business assets can be supplied manually or be imported from an organizational repository.

Defining or Updating Attack Starting Points

Stage 20 includes the definition of the potential or actual attack starting points. The definition of attack starting point (also called "threat origin") might include the nodes or IP addresses from where the attack can be initialized. For example, the Internet, a network of a business partner, a specific internal network, etc. The representation of the attack starting point in the model might consist of the assumed capabilities of the potential attacker and the likelihood of initiating attack from that starting point. The definition is typically performed manually based on a-priory knowledge of security analysts.

When attack trial is identified by the SEM with high enough confidence (stages 80 and 100), a new attack starting point might be added to represent the source of the attack trial, and possibly the target of the attack trial (in case of high success likelihood). This is represented in FIG. 1 by the arrow from stage 100 to stage 20.

If the attack starting point is already represented, the likelihood of initiating attack from it might be updated with a relative high likelihood value.

Creating an Attack Actions Dictionary

Stage 30 includes generating a dictionary of attack actions. The information in the dictionary is required for performing the attack simulation. The dictionary represents known vulnerabilities and their exploitation methods, worms attacking actions and propagation methods, and general hacking actions (such as port scan, brute force, file transfer, DDOS attack, and the usage of backdoors or Trojans).

Modeling an attacking action in the dictionary is done by specifying for each action information such as: (i) The preconditions and effects for applying the action, (ii) The vulnerabilities which are exploited (if any), (iii) Worms which can perform the action (if any), (iv) The services, ports, and protocols which should be used for the attack, (v) Technical characteristics of the exploitation action, (vi) Estimated difficulty, and (vii) Time considerations.

For example, the potential exploitation of the CVE-2002-0392 vulnerability might be represented in the dictionary as follows: (a) Type—Vulnerability exploitation; (b) CVE ID—CVE-2002-0392, (c) Title—Apache Chunked-Encoding Memory Corruption Vulnerability; (d) Service—Apache web server; (e) Preconditions—Remote access to a vulnerable Apache web server using http protocol; (f) Effects—Denial of service or arbitrary code execution; (g) Difficulty—Easy.

CVE is a dictionary of publicly known information security vulnerabilities and exposures. CVE-2002-0392 is the ID of a specific vulnerability in the CVE dictionary that is related to the Apache HTTP server.

The dictionary of attacking actions might be held in a repository with entries for known vulnerabilities, known worms, and general hacking actions.

The dictionary of attacking action is independent of the network model. In a system which implements the method it can be prepared centrally and distributed to all clients who work with the system.

Simulating Attacks and Analyzing Risk

Stage 40 relates to simulating attacks and analyzing risks. This can be done for example in a manner illustrated in U.S. Pat. No. 6,952,779 of Cohen et al., which is incorporated herein by reference. The attack simulation can determine the possible multi-step attacks from start points (source nodes on which an attacker might reside) to nodes and business assets within the network. The attack simulation stores its results in an attack graph. The attack graph records using graph nodes and links the attacker achievements (state of services) and the transitions (attack steps or actions) which enabled these achievements. The attack analysis can be used for computing the exposure level of vulnerabilities: (a) Directly exposed vulnerability—a vulnerability instance that can be directly exploited from attack starting points (from the "threat origins"); (b) Indirectly exposed vulnerability—a vulnerability instance that can be exploited only based on the achievements of exploiting another vulnerability instance; (c) Inaccessible vulnerability—a vulnerability that cannot be exploited directly or indirectly from a n attack starting point.

The exposure level can relate to all start points or to a selected set of start points (for example, exposure to external threat origins such as the Internet or the networks of Partners).

An exposure level can be associated also with the attack steps in the attack graph (including also attack steps that relate to general hacking actions rather than venerability exploitation).

The risk analysis is performed for estimating the risk of the possible attacks. The risk to a business asset as a result of a possible attack is the multiplication of the estimated likelihood to successfully perform the attack and the potential impacts of the attack on the business asset. The impacts typically relate to security losses such as confidentiality, integrity, and availability.

Computing the estimated likelihood of successfully performing an attack takes in account the likelihood of initiating the attack from the start points, and the likelihood to succeed in performing the attack steps used for the attack.

The risk analysis can also associate attack likelihood and risk estimations with each vulnerability or attack step. More specifically, computing the following attributes: (a) The likelihood for exploiting successfully the vulnerability (or performing successfully the attack step); (b) The imposed risk—the risk which attacks that use the vulnerability (or the attack step) can cause, by attacking business assets (or information assets) of the organization. Both the likelihood for the success of such attacks and the potential damage are taken into account in computing the imposed risk; (c) The relative imposed risk—the risk of continuation attacks, assuming the attacker already succeeded in exploiting the vulnerability (or performing the attack step).

The next items describe a method which can be used for computing, or approximating, the above attributes: (a) Compute for each node n in the attack graph the attribute p_arrive(n)—the maximum likelihood to arrive at the node using a single path which starts at an attack start point. This can be done by using a forward propagation algorithm which starts at the attack start points, and updates the p_arrive of each encountered node to be the local success likelihood of the node (p_success) multiplied by the maximum of the p_arrive value of its predecessors. A modification to the p_arrive value of a node requires updating the p_arrive value of its successors. The local success likelihood of a node that represent a vulnerability exploit is determined based on various attributes of the vulnerability such as the existences or inexistence of an automated exploit for the vulnerability, the estimated exploitation difficulty, the required skill level of the attacker, the commonality of the vulnerability, and more; (b) Computing for each node n relative_imposed_risk (n)—the maximal risk the node can impose using a singe path, assuming that the node itself was performed or achieved. This can be done by using a backward propagation algorithm which starts at attack end points (e.g. nodes that relate to business assets), and updates the relative_imposed_risk of each encountered node to be the local success likelihood of the node multiplied by the maximum of the relative_imposed_risk value of its successors. A modification to the relative_imposed_risk value of a node requires updating the relative_imposed_risk value of its predecessors; (c) Update the imposed_risk of each node n to be p_arrive(n)*relative_imposed_risk(n)/p_success(n).

A more precise computation (but more complex) can use Bayesian networks based techniques.

The attack simulation and the risk analysis can be re-invoked on a regular basis (e.g., every night), or when changes are made to their inputs: the network model, the attack actions dictionary, or the set of attack start points.

The attack simulation can also be used for checking which attack steps are possible from a specified source, or between a specified source and a specified target.

The knowledge extracted by the attack simulation can assist in Identifying and prioritizing security events (stage 80) and in supplying contextual information (stage 90) for handling the identified security events (stage 100).

In order to use the knowledge extracted by the attack simulation in identifying and prioritizing security events, two different techniques can be applied: (a) Creating data items which represent the attack simulation knowledge in a way that can be correlated in stage 80 with real-time events. Stage 70 is responsible for representing the attack simulation knowledge using data items; and (b) automatically generating correlation rules which express some of the knowledge gathered in the attack simulation. This process is performed as part of stage 50.

Combinations of these two techniques are also possible.

Retrieving and Representing Attack Simulation Knowledge

Stage 70 includes the retrieval and representation of the attack simulation knowledge so it can be used for identifying and prioritizing security events (stage 80). According to one embodiment, the method generates data items which can be used for event correlation out of data structures produced by the attack simulation (such as the attack graph). These data items might represent vulnerability instances and details on the feasibility of exploiting them, or more generally, represent attack steps explored by the attack simulation. Special data items might be created for representing the scope of the attack simulation specifying which attacks were examined by the attack simulation. According to another embodiment, a query interface is supplied for retrieving knowledge on explored attack steps and vulnerability exploits. That query interface is used by the process which identifies and prioritizes security events (stage 80) to get attack simulation knowledge whenever it is needed. The attack simulation might be invoked (with the required context) when answering the query requires data which has not been produced yet by the attack simulation (or has not been saved). The different techniques are described in more details in the next sub-sections.

Vulnerability Instance Representation

One type of data items that can be generated to represent the attack simulation knowledge is related to vulnerability instances. A data item is created for each vulnerability instance in the model, associated with its exposure level, its imposed risk, and some other details. More specifically, the data item might include the following information: (i) A catalog ID of the vulnerability (e.g., CVE ID); (ii) IP address of the node on which the vulnerability resides; (iii) The service or port which is used for exploiting the vulnerability; (iv) Optionally, a list of attack sources (IP addresses) from which the exploit can be performed; (v) The exposure level of the vulnerability (e.g., direct, indirect, or inaccessible); (vi) Optionally, the likelihood for exploiting successfully the vulnerability. This likelihood takes in account the likelihood of initiating attacks at start points, the likelihood of performing a pre-requisite sequence of attack steps, and the likelihood of succeeding exploiting the vulnerability itself; (vii) The imposed risk and the related imposed risk of the vulnerability.

The generation of the data items can be done by finding in the attack graph the nodes that represent exploitation of vulnerabilities, and retrieving the data associated with these nodes and possibly with predecessors of these nodes.

Attack Step Representation

A more comprehensive way for representing attack simulation knowledge is to represent every attack step as a data item. Attack steps can relate to exploitation of vulnerabilities or to other attack actions such as remote login, ftp, brute force, etc. The information associated with a data item that represents an attack step might include: (a) An identifier of the attack action (a catalog ID of the vulnerability is a special case); (b) IP address of the target node of the attack step; (c) The service or port which is used for performing the attack step; (d) A list of attack sources (IP addresses) from which the exploit can be performed; (e) The exposure level of the attack step (e.g., direct, or indirect); (f) The likelihood for performing successfully the attack step. This likelihood takes in account the likelihood of initiating attacks at start points, the likelihood of performing a pre-requisite sequence of attack steps, and the likelihood of succeeding performing the attack step itself; (g) The imposed risk and the related imposed risk of the attack step.

The generation of the data items can be done by finding in the attack graph the nodes that represent attack steps and retrieving the data associated with these nodes and possibly with predecessors of these nodes.

Representing the Scope of the Attack Simulation

The attack simulation does not necessarily check all the possible attack steps. Usually attack steps are tried from a source node only if the node is either a start point of the simulation, or a node that can be reached from a start point (by applying some sequence of attack steps).

In order to supply to the SEM information on what was examined by the attack simulation, special data items can be generated to represent the considered source nodes—nodes from which the attack simulation tried to perform attack steps.

If an attack step is not reported by the attack simulation, but its source is marked as considered by the attack simulation, the attack step can be considered as impossible (it was examined by the attack simulation and was found as infeasible). Non possible attack steps are usually not recorded explicitly in order to save space. In case attack steps are not possible because they were blocked by some counter measure such as firewall or IDP, they might be recorded for explanation purposes (to explain why the attack step is not possible).

It is also possible to record using special data items some other aspects of the attack simulation scope: the vulnerability types and the attack actions that were considered, and the nodes on which the attack simulation had sufficient knowledge for evaluating them (knowledge on services, vulnerability instances, etc.).

Dealing with NAT Rules

The usage of NAT (network address translation) rules in network devices (firewalls, load balancers, proxies, etc.) might make it difficult for the SEM to correlate between events, as the source or the target IP addresses is changed along the routes of the packets. NAT rules of network devices might also make it difficult to correlate between the source and target IP addresses that appear in attack simulation data items, and those which appear in the events. Since the attack simulation performs an access analysis for checking the possibility to perform an attack step from a source to a target, it can record the IP addresses which were used pre and post address translation along the packet route, and even tag the addresses which are relevant to different data sources of the SEM. Note that such tagging requires a representation of the data sources (the events collectors) in the network model.

The Query Approach

An alternative method for representing the attack simulation knowledge using data items is to supply a query interface for the attacks simulation knowledge. The process which identifies and prioritizes security events (stage 80) use the query interface to check if an identified event matches a possible attack step, or whether such an event is possible or not according to the attack simulation.

An example for a supported query is: is Possible(in action_type, in source, in destination, out likelihood, out risk)—a query that get as input parameters of an event: the action type (e.g., the exploitation of a specified vulnerability), the source address of the event an the destination address of the event. The query determines if the action is possible or not based on the attack simulation knowledge, and if yes retrieves the likelihood and risk of the event according to the attack simulation.

The attack simulation knowledge is stored in a way that enables answering efficiently such queries.

The knowledge includes information on the possible attack steps, their likelihood, and risks.

The attack graph and an index that relates to source addresses, destination addresses, and action type might be used as away to store the knowledge.

The recoded information might also include information on the scope of the simulation (what was examined).

If the attack simulation knowledge does not include an answer for a query, the attack simulation can be re-invoked with a specific required context to supply the answer (this interaction is represented by the back arrows from stage 80 to stage 70 and from stage 70 to stage 40).

Defining or Updating Rules and Parameters

In stage 50 the rules and parameters for controlling the event correlation and prioritization (step 80) are defined. SEMs include paradigms for specifying these rules (for example, using decision trees), and then use them to guide their event correlation process.

Traditionally, the specification of correlation rules (or decision trees), is done manually by the SEM vendor, by consultants, or by the operators of the SEM.

One option is to use this method also here but augmenting the set of rule to consider also the data items extracted from the attack simulation, and to relate to attributes of matching data items in determining attributes of the identified security events (such as confidence and priority)

These correlation rules are generic. They relate to match between an event and data item based on fields like source addresses, target addresses, target services (or ports), event signature (and the type of the vulnerability or attack step).

Rules might be introduced to check if the event was examined by the attack simulation: (i) Check a matching between the source address of an event and the scope data items which specify the nodes from which the attack simulation tried to perform attack steps; and (ii) Check a matching between the signature (or type) of the event and the vulnerabilities and actions examined by the attack simulation No matching of an event with an attack step, but a matching with simulation scope means that the event is not possible according to the attack simulation.

According to another embodiment of the method, the knowledge gained by the attack simulation and risk analysis is used for automatically generating rules for the SEM. The rules represent the attack simulation knowledge, and save the need to represent that knowledge using data items. That means that generated rules in this case are not generic but are specific to the organizational network and its weaknesses.

For example, it is possible to create a rule for each vulnerability instance exist in the network in order to identify the actual exploitation of the vulnerability. This can be done for all vulnerability instances, only for vulnerability instances that can be exploited according to the attack simulation, or only for a limited set of vulnerability instances which were found by the attack simulation to be risky enough (based on the imposed risk and the exposure level of the vulnerability).

More comprehensively, it is possible to create for each attack step found by the attack simulation a corresponding rule that identifies actual execution of the attack step. Also in this case, the generation of rules might be limited only to attack steps that were classified as risky enough.

The rule specification might include: (i) The IP address of the target node; (ii) The action to be identified (for example, by specifying a catalog ID of the vulnerability or an attack signature); (iii) The target port or service; or (iv) Optionally, source IP addresses of the attack step.

The rule can also specify a confidence and priority to be associated with the identified events.

The confidence can be based on the exposure level of the vulnerability (or the attack step), or more accurately on the a-priory likelihood of exploiting the vulnerability (or performing the attack step).

It is also possible to generate for each exploitable vulnerability (or risky enough exploitable vulnerability) a rule which correlates between events that indicate the exploitation of the vulnerability and events which indicate the success of exploiting the vulnerability. Success indications can be for example, communication back from the target to the source, successful remote login into the target from the source, continuation attack attempts that their source is the node on which the vulnerability resides. The continuation attack attempts which are specified in the rules could be general ones, or those which match a possible continuation attack step identified in the attack simulation.

Similar correlation rules can also be generated for attack steps that were found as possible by the attack simulation and do not relate to vulnerability exploitation.

When NAT rules are used in network devices of the organization, the generated correlation rules can express the relations between pre translated and post translated IP addresses.

Collecting Event Data

Stage 60 includes the collection of event data from various sources, as typically done by SEMs: intrusion detection and prevention systems (IDPs), firewalls, VPNs, authentication and access control mechanisms, security applications, network devices, operating systems, applications, databases, etc.

The collection of events might require access to log of such systems or capturing events and alerts which these systems generate. The collection of events typically includes also a stage of normalization in which events from various sources are mapped into a standardized scheme.

Identifying and Prioritizing Security Events

Stage 80 includes the process of identifying and prioritizing security events.

This process analyzes the relative low level events it gets as an input (from stage 60), in order to identify "real" security events. The process is typically performed by a SEM using an event correlation engine. The event correlation engine compares and combines data of different events, in order to filter out the false-positive events and identify attacks and malicious activity in the network.

The correlation is guided by pre-defined rules (defined in stage 50).

The output of the process is security events which have to be handled by the operators (or automatically by the system).

According to our method, the event processing includes also the usage of information extracted by attack simulation and risk analysis. The usage of that information can improve the results produced by the SEM: filtering out false-positive events which cannot be not identified easily otherwise, associating a relatively high confidence with events that match possible attack actions, enable correlation between events when network address translation (NAT) may make this correlation difficult, incorporating risk considerations in prioritizing the security events, and in certain cases saving the need to process or collect some kind of events.

The details of the method are described in the next sub sections.

Correlating Events with Simulation Based Data Items

In the case where data items are generated to represent the knowledge extracted by the attack simulation (stage 70), the SEM is instructed (using correlation rules) to perform correlation between events which might indicate the exploitation of vulnerabilities, and data items which express the possibility to exploit these vulnerabilities (based on the attack simulation).

A correlation is found if there is a match between the key fields of the event and the key fields of the attack simulation data item. More specifically, a correlation requires a match between the attack signature of event and the type of the vulnerability, a match of the target nodes and ports (or services), and a match of source addresses (if exists in the data item).

Once a match is found it can be used for determining the confidence and the priority of the security event.

When the attack simulation data items, are held in a format similar to those of the events, no change is required from the existing correlation mechanisms of the SEM (it sees the data items as kind of events).

To address some specific characteristics of the attack simulation data items relative small changes have to be done to existing correlation mechanism of the SEM which is used. For example, the data item of attack simulation has no particular time stamp, but it still has to be successfully correlated with events with a specific time stamp. Or, the data item might have a range of source addresses where an event has a specific source address.

Determining the Confidence of the Security Event

The confidence (the likelihood that the event indicates a real attack that succeeded or going to succeed) can be determined using various methods, one responsive to the exposure level specified for a data item and the other based on likelihood associated with a data item.

According to the exposure level specified for data item (representing a vulnerability or an attack step): (i) A relative high confidence if the exposure level is direct; (ii) A somewhat smaller confidence if the exposure is indirect (and there were no indications for attacks on the source node); and (iii) A low confidence if the vulnerability instance was classified by the attack simulation as inaccessible, or if no match was found with attack simulation data items.

Based on the likelihood associated with the data item (representing a vulnerability or an attack step): (i) When there is a match between the event and a data item the confidence of the event is determined according to the likelihood of the data item; and (ii) When there is a match between an event and an attack step that is marked as blocked (we mentioned the possibility to create such data items in stage 70), the event gets a very low confidence (the success of the attack step is not possible according to the attack simulation).

When no matching data item is found, it is checked whether the event is in the scope of the attack simulation. If yes, the confidence of the event is set to very low (as according to the attack simulation it is not possible to succeed in that attack step). If the event is not in the scope of the attack simulation, the confidence of the event is defined based on event data, with possibly some reduction of the confidence (as the attack simulation has not found a way for an attacker to control the source).

It is also possible in that case to request the attack simulation to explicitly check the feasibility of the attack step from the non-considered source to the target of the event, and then to determine the confidence based on the result.

Checking whether an event is in the scope of the attack simulation can be done by correlating the event with scope data items: matching the event source with considered sources of the attack simulation, matching the event target with the nodes that are considered as having sufficient information for evaluation, and matching the attack signature appears in the event with the vulnerability types considered by the attack simulation. If there is a match in all these aspects the event is in the scope of the attack simulation (otherwise, it is not).

Upon user preferences, events with a too low confidence can be filtered out.

Some relative small modification might be required to the used SEM in order to consider the above information in determining a confidence for the event.

Determining the Priority of the Security Event

The priority of handling events (that their confidence is above a certain threshold) can be determined according to the imposed risk or according to the relative imposed risk of the corresponding data items. Another option is to use as a risk measure, the multiplication of the relative imposed risk by the confidence of the event. The risk measure can be mapped using a mapping table into a priority scale (for example, very low to very high, or 0 to 100). In that way security events with higher damage expectation get a higher priority for being handled by the security analysts that operate the system.

The method is also applicable when data items are generated only for those vulnerability instances of the highest priority, such as directly exposed vulnerability of a high risk.

Again, some relative small modification might be required to the used SEM in order to consider the above information in determining a priority for the event The Usage of Queries In the case the knowledge extracted by the attack simulation is accessible using queries, when an event of a certain type is identified by the SEM (e.g., an indication for exploitation trial of vulnerability) a query is submitted to answer if the event corresponds a possible attack step.

The confidence and the priority of the identified event is determined based on the answer to the query and optionally by the likelihood and the risk which were retrieved.

The usage of queries requires enhancing the SEM correlation mechanism, so it could initiate queries as a result of identifying particular events, and consider the query results in determining the status and the attributes of the security event.

When the knowledge extracted by the attack simulation is represented using rules (generated at stage 50) rather then by data items or by using queries, the SEM simply uses these rules to find matching events. The matching events are associated with a confidence level and priority based on what is specified in the rule.

Handling Security Events

Stage 100 includes the handling of security events. Once a security event with a high enough confidence is identified (stage 80) it should be analyzed and decisions have to be taken whether and how to handle it. This activity is typically performed by operators of the SEM (though parts of this activity can be automated). A decision that a security event indicates a real attack and that the attacker has gained some privileges on a node in the network can implies updating the attack starting points of the attack simulation (stage 20) with a new start point. Security events can also be used to adjust the likelihood to attack which is associated with existing attack starting points. That likelihood might be based on statistics of attack trials initiated at the start point.

Extracting Contextual Information

In order to make informed human (or machine) decisions on how to handle an identified security event, contextual information has to be supplied. This is done in stage 90, by extraction the contextual information from the attack simulation. The contextual information might specify: (i) What are the next possible steps of the attacker from the current target node, ranked by risk: (The next nodes that can be attacked, The means to attack these nodes: vulnerabilities, possible access in between nodes, or The imposed and relative imposed risk); (ii) What are the next possible steps of the attack from the source node of the attack (the event indicates that the attacker has a control on the source node); (iii) Which security counter-measures can be used for blocking the possible next attack steps. For example, firewall or IPS that can be instructed to block the communication required for performing the next attack step; and (iv) Which other nodes could be controlled by the attacker in the way from attack start points to the source node of detected attack step. The nodes can be associated with an estimated likelihood of being used for the attack. The information can be presented as a list of nodes, by highlighting nodes and networks on a topological network map, or by presenting an attack graph.

The computation of the next possible steps and their associated imposed risk can be done by either using a previously generated attack graph that included the possibility to perform the attack step indicated by the security event, or by initiating a new attack simulation computation which takes the source and target node of the attack step as start points (the arrow in FIG. 1 from stage 90 to stage 20). When an existing attack graph is used, a re-computation of likelihood and the risk should be done, taking in account the evidence provided by the security event that the attack step has been performed.

Example

The following example illustrates how attack simulation data can be combined with event data to improve the results of the SEM, and which contextual information can be extracted to help in handling the identified security events.

The Network

Figure 2:
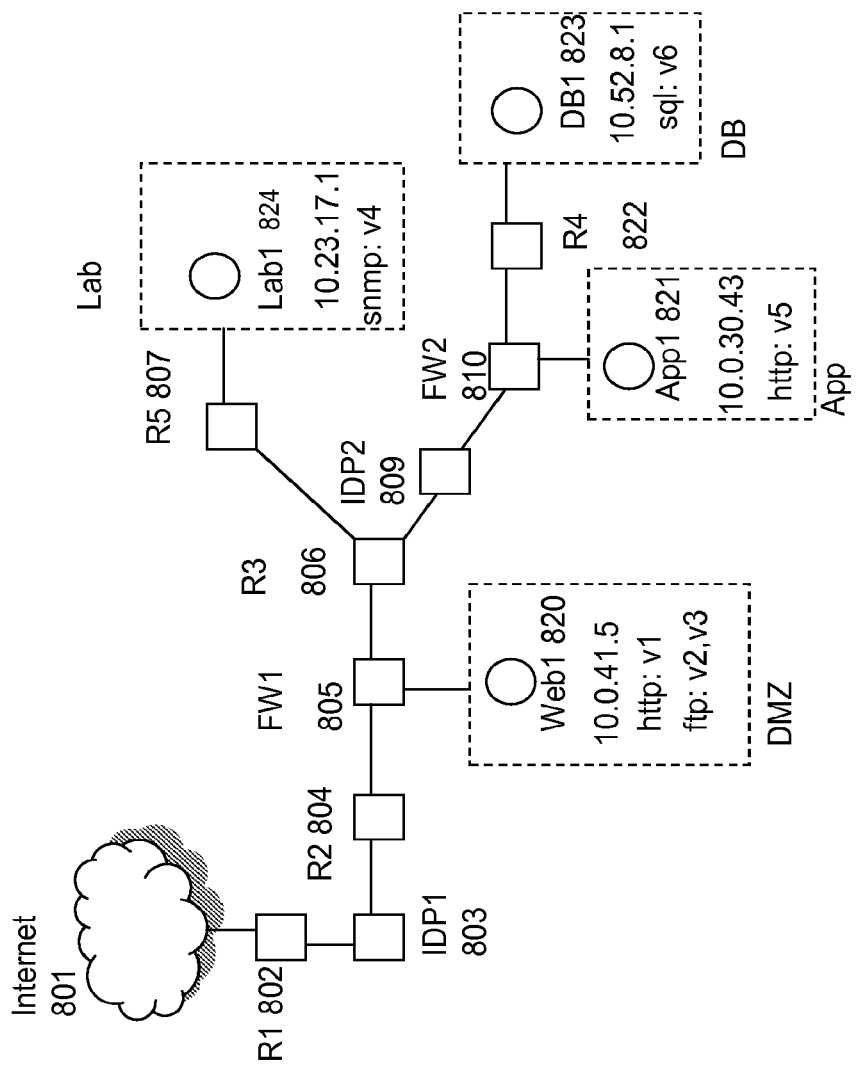
FIG. 2 illustrates a modeled network, according to an embodiment of the invention.

FIG. 2 presents a network that includes various subnetworks with servers: DMZ, App, DB, and Lab.

Web1 server (within the DMZ network) has an http service (e.g., Microsoft IIS) which includes the v1 vulnerability, and an ftp service which includes the v2 and v3 vulnerabilities. Microsoft IIS (Internet Information Services) is a set of Internet-based services for servers using Microsoft Windows.

The App1 server has also an http service. This service has the v5 vulnerability. The DB server DB1 supports an SQL service which has the v6 vulnerability. The Lab1 server has a snmp service with the v4 vulnerability.

The network includes five routers: R1 802, R2 804, R3 806, R4 822, R5 807, two firewalls: FW1 805 and FW2 810, and two intrusion detection and prevention systems: IDP1 803, and IDP2 809. The R1 router connects the network with the Internet 801. The App1 servers 821 and the DB1 servers 823 are considered as business assets with high impact upon confidentiality, integrity and availability loss. The Web1 server 820 is associated with medium level business impact, and Lab1 824 is associated with low business impact.

The Results of the Attack Simulation

Figure 3:
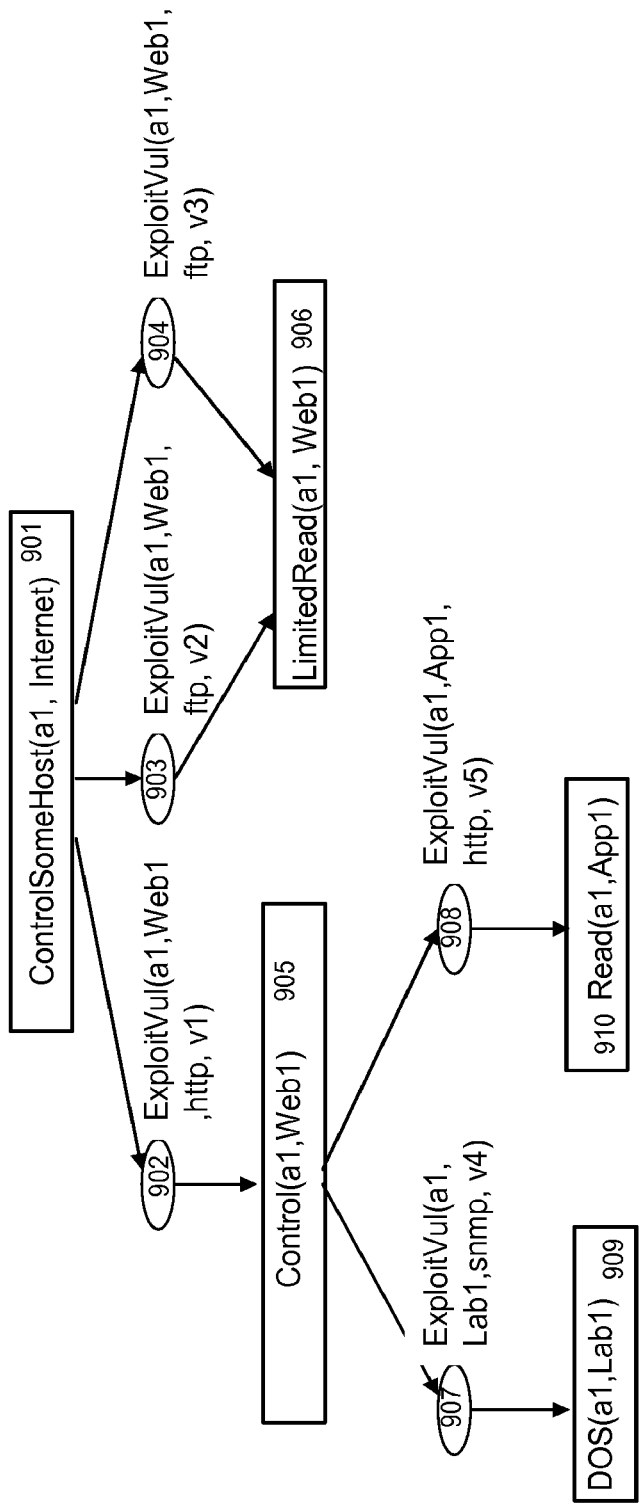
FIG. 3 illustrates an attack graph according to an embodiment of the invention.

The attack simulation is invoked on a network model which represents the network, using the Internet as an attack starting point. It finds out that attacks on the network are possible from the Internet, and extracts the attack graph illustrated in FIG. 3.

The oval nodes (902, 903, 904, 907 and 908) in the attack graph represent attack steps (actions). The rectangular nodes (901, 905, 906, 909 and 910) represent achievements (facts). The graph shows that by exploiting http vulnerability v1 on Web1, an attacker (marked as a1) which is initially located at the Internet can achieve control on Web1. The attacker can then either attack App1 by exploiting vulnerability v5, achieving reading ability of files on the App1 server, or attack Lab1 by exploiting snmp vulnerability v4, causing denial of service (DOS) to the Lab1 server. The attacker can also attack the Web1 server using the v2 and v3 ftp vulnerabilities, enabling the attacker to read files in some specific directories on Web1 ("limited read").

The knowledge gathered in the attack simulation on which vulnerabilities can be exploited and from where, is represented in the SEM using data items (generated by stage 70). These data items are presented in the next table.

| Exploitation of vulnerability | Vulnerability type | Target Node (the node on which the vulnerability resides) | Target Service | Possible Attack Sources | Exposure Level (Internet) | Imposed Risk |
|---|---|---|---|---|---|---|
| v1 | CVE-5 | Web1 IP: 10.0.41.5 Pre NAT: 154.14.2.7 | http | Internet | Direct | High |
| v2 | CVE-6 | Web1 IP: 10.0.41.5; Pre NAT: 154.14.2.7 | ftp | Internet | Direct | Medium |
| v3 | CVE-7 | Web1 IP: 10.0.41.5 Pre NAT: 154.14.2.7 | ftp | Internet | Direct | Medium |
| v4 | CVE-8 | Lab1 IP: 10.23.17.1 | snmp | Web1 IP: 10.0.41.5 | Indirect | Low |
| v5 | CVE-5 | App1 IP: 10.0.30.43 Pre NAT: 154.16.1.4 | http | Web1 IP: 10.0.41.5 | Indirect | High |
| v6 (blocked attack step) | CVE-3 | DB1 IP: 10.52.8.1 Pre NAT: 154.17.2.5 | sql | Blocked from the Internet | Inaccessible | None |

CVE-5 represents some hypothetical CVE ID (in general CVE ID has the format: CVE-year-number).

Vulnerabilities v1, v2, v3 were found to be directly exposed (they can be the first attack step from the start point—the Internet). Vulnerabilities v4 and v6 have indirect exposure level (can be exploited only after another attack step—the exploitation of v1). Vulnerability v6 was found as inaccessible.

Vulnerability v1 was associated with high risk since it enables a multi-step attack of App1 which is likely to succeed causing high impact. Vulnerabilities v2 and v3 were associated with a medium risk as they might cause medium impact on the web server, but they do not enable continuation attack steps.

FW1 includes NAT rules which translate the target address of packets arrived outside of the organization into private addresses. In particular: (i) Destination address 154.14.2.7 is translated to 10.0.41.5; (ii) Destination address 154.16.1.4 is translated to 10.0.30.43, and (iii) Destination address 154.17.2.5 is translated to 10.52.8.1.

Therefore, the node column of the data items includes also pre NAT addresses that were used for the attack steps.

The Scope of the Attack Simulation

The following information is recorded using data items for representing what was checked by the attack simulation: (i) Examined source nodes for attack steps: (a) the Internet (the attack starting point); (b) Web1 (the only node that could be controlled by attackers using attacks from the starting point). (ii) Nodes with sufficient information for evaluating by the attack simulation: Web1, App1, Lab1, and DB1. In this example the assumption is that all those nodes were scanned and have full vulnerability information; (iii)

the considered types of attack steps: all the vulnerabilities and attack actions appear in the dictionary (including CVE-3, CVE-5, CVE-6, CVE-7, and CVE-8).

An Attack Scenario

Assume that an attacker from the Internet (IP address 138.42.12.6) tries to attack the organizational network by: (a) Exploiting the sql vulnerability on DB1 (an attack which fails since FW2 blocks the packet), and (b) Exploiting exposed vulnerabilities on Web1 (http, ftp).

Exploiting the http vulnerability on Web1 eventually succeeds and the attacker gets control on the machine. After couple of hours the attacker tries to attack other internal machines of the organization from Web1.

The Reported Events

The SEM of the organization gets input from the two IDP devices and from the SQL application of DB1. Assume that the SEM got the events presented in the next table:

| Event ID | Data source | Time | Source IP | Target IP | Target service | Event category | Event signature |
|---|---|---|---|---|---|---|---|
| e1 | IDP1 | 7 Jun. 2012, 10:03:05.13 | 138.42.12.6 | 154.17.2.5 | Sql | Vulnerability Exploit | CVE-3 |
| e2 | IDP1 | 7 Jun. 2012, 10:07:11.093 | 138.42.12.6 | 154.14.2.7 | http | Vulnerability Exploit | CVE-5 |
| e3 | IDP1 | 7 Jun. 2012, 10:09:21.32 | 138.42.12.6 | 154.14.2.7 | ftp | Vulnerability Exploit | CVE-6 |
| e4 | IDP2 | 7 Jun. 2012, 10:03:05.15 | 138.42.12.6 | 10.52.8.1 | Sql | Vulnerability Exploit | CVE-3 |
| e5 | IDP2 | 7 Jun. 2012, 12:19:05.17 | 10.0.41.5 | 10.0.11.3 | — | Port scan | PORT-SCAN |

Events e1 and e4 are both related to the attack on DB1 (captured by both IDP1 and IDP2).

Events e2 and e3 indicates attack trials on Web1 (http and ftp)

The e5 event captures a port scan performed from Web1 on some internal machine of the organization.

Correlating Events with Attack Simulation Data Items

The SEM correlates between events and between events and data items that represent attack simulation knowledge. The correlation rules check for match of source addresses, target addresses, target services (or ports), event signature (and the vulnerability type), and time proximity (when relevant).

Confidence and priority are determined based on attributes of matching data items.

The correlation results and the implication on the confidence and the priority of the security events are presented in the next table:

| Security Event | Correlated Input Events | Vulnerability | Vulnerability properties Exposure level | Imposed Risk | Confidence | Priority |
|---|---|---|---|---|---|---|
| s1 | e1, e4 | v6 (blocked attack step) | Inaccessible | None | F/P | Not to handle |
| s2 | e2 [,e5] | v1 | Direct | High | High | High |
| s3 | e3 | v2 | Direct | Medium | High | Medium |

Note that pre NAT addresses associated with the data items were used for the correlation with events.

For example the target address of the e1 event (154.17.2.5) matched the pre NAT address of the target node of v6. IDP1 reported on pre NAT address for e1 since it captured the event before its target address was translated into the real IP address of the node (is done by FW2). Event e4 reported by IDP2 was also correlated with the data item of v6 (using the real IP address of the target node). As a result we got a security event s1 that represent the correlation of e1, e4, and v6.

However, since v6 is classified as a blocked attack step (it cannot be reached from the Internet), e1 and e4 can be dropped. They indicate an attack trial but not an attack that can succeed.

Note that even if it was chosen (in stage 70) not to create a data item for v6 (a blocked attack step), e1 and e4 could be dropped. In this representation e1 or e4 do not match any vulnerability exploitation found by the attack simulation, but their source matches the examined source nodes of the attack simulation (the Internet in this case). That means that the simulation checked that step but found it impossible. Both vents can be dropped (considered as F/P).

Associating Confidence and Priority

The s2 security event which represents the matching e2 and v1 gets a high confidence since the attack simulation indicates that the exploitation of v2 is possible, The s2 security event is associated with a high priority due to the high imposed risk of v1 (a continuation attack with high impact is possible). The s3 event which represents the correlation of e3 and v2 gets a high confidence but medium priority as the attack is possible but the impact is limited.

As a result, handling s2 and its potential implication (attacker control on Web1) will get the highest attention by the SEM operators in near real time. The e5 event, which arrives two hours later, might supply the indication that Web1 indeed was compromised by an attacker. It is correlated with the "historic" security event s2.

Usage of Contextual Information when Handling Security Events

Assume that the operator of the SEM handles the s2 security event (which got the highest priority). The contextual information that is presented lists the possible continuation attacks from Web1: (a) Attacking Lab1 using the v4 vulnerability of the snmp service. The imposed risk of that attack is low (low impact for availability loss of the Lab1 server); (b) Attacking App1 using the v5 vulnerability of the http service. The imposed risk of that attack is high (high impact for confidentiality loss of the App1 server).

The contextual information also specifies possible blocking activities. For example, in order to block the potential continuation attack on App1: (a) Instruct IDP2 to block exploitation of CVE-5 using packets sent from Web1 (10.0.41.5) to App1 (10.0.30.43), or: (b) Instruct FW2 to temporarily block http access (port 80) from Web1 (10.0.41.5) to App1 (10.0.30.43), or: (c) Temporarily shutdown the http service of App1.

That information helps the operator to focus on effective actions for handling the reported situation.

Figure 4:
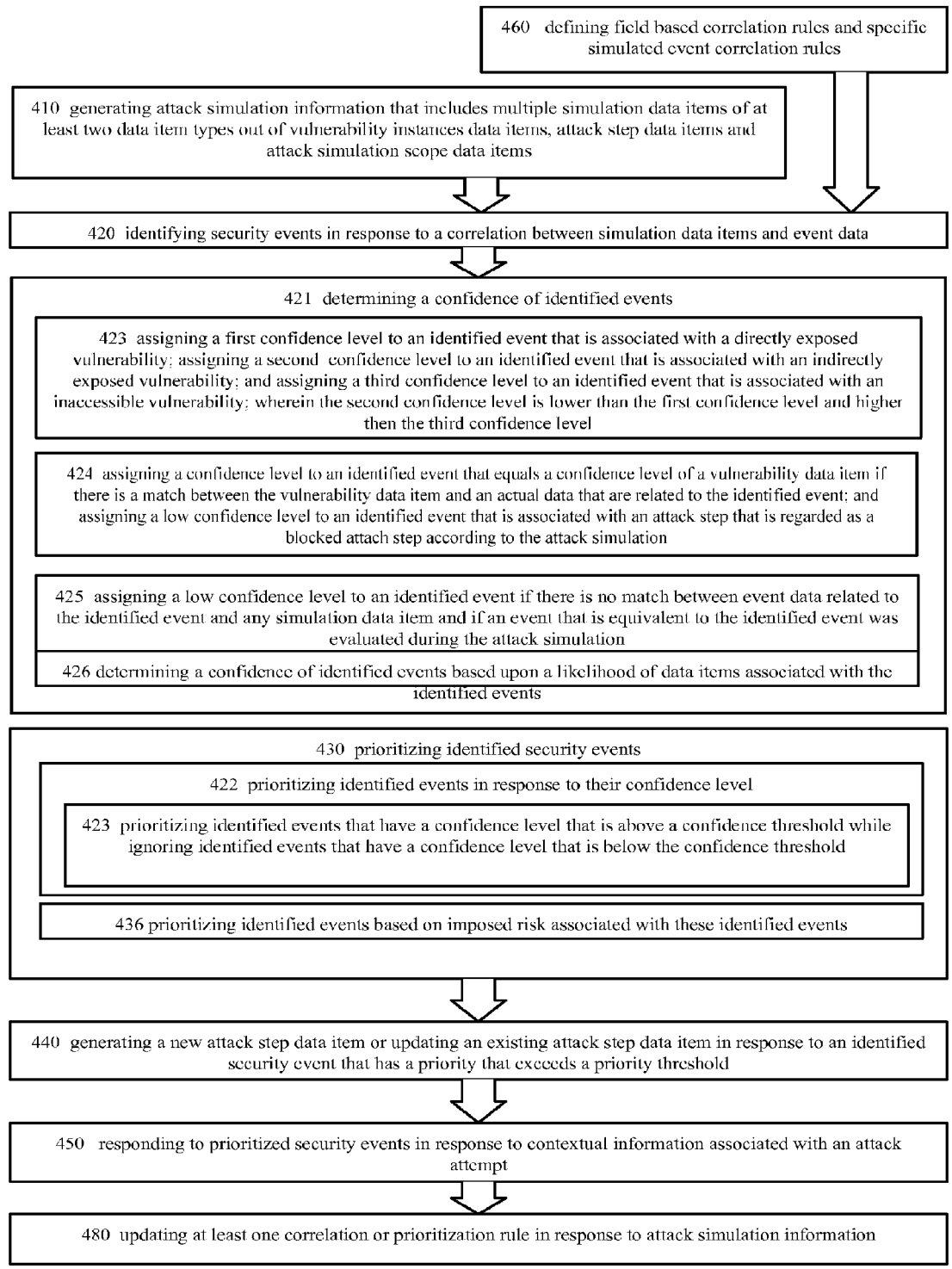
FIG. 4 is a flow chart of a method, according to an embodiment of the invention.

FIG. 4 is a flow chart of method 400, according to an embodiment of the invention. Method 400 starts by stage 410 of generating attack simulation information that includes multiple simulation data items of at least one data item types out of vulnerability instances data item, attack step data items and attack simulation scope data items. The generating of attack simulation information is responsive to a network model, at least one attack starting point and attack action information. Stage 410 can include generating attack simulation information that includes multiple simulation data items of at least one data item type out of vulnerability instances data items, attack step data items and attack simulation scope data items.

Stage 410 is followed by stage 420 of identifying security events in response to a correlation between simulation data items and event data.

Stage 410 can be executed by a first computer while stage 420 can be executed by a second computer. The first and second computers can be located in close proximity, far away from each other and the like.

Stage 420 can be followed by stage 421 of determining a confidence of identified events. Alternatively, stage 420 is followed by stage 430.

Stage 421 can include stage 423 of assigning a first confidence level to an identified event that is associated with a directly exposed vulnerability; assigning a second confidence level to an identified event that is associated with an indirectly exposed vulnerability; and assigning a third confidence level to an identified event that is associated with an inaccessible vulnerability; wherein the second confidence level is lower than the first confidence level and higher then the third confidence level.

Stage 421 can include stage 424 of assigning a confidence level to an identified event that equals a confidence level of a vulnerability data item if there is a match between the vulnerability data item and an actual data that are related to the identified event; and assigning a low confidence level to an identified event that is associated with an attack step that is regarded as a blocked attach step according to the attack simulation.

Stage 421 can include stage 425 of assigning a low confidence level to an identified event if there is no match between event data related to the identified event and any simulation data item and if an event that is equivalent to the identified event was evaluated during the attack simulation.

Stage 421 can include stage 426 of determining a confidence of identified events based upon a likelihood of data items associated with the identified events.

Stage 421 is followed by stage 430 of prioritizing identified security events.

Stage 430 can include stage 432 of prioritizing identified events in response to their confidence. Stage 432 can include stage 433 of prioritizing identified events that have a confidence level that is above a confidence threshold while ignoring identified events that have a confidence level that is below the confidence threshold.

Stage 430 can include stage 436 of prioritizing identified events based on imposed risk associated with these identified events—or more exactly—the imposed risk associated with data items that correspond to the identified event. Identified events (data items associated therewith) that are associated with higher imposed risk levels can be assigned higher priorities.

Stage 430 can be followed by stage 440 of generating a new attack starting point or updating an existing attack starting point in response to an identified security event that has a priority that exceeds a priority threshold. Stage 440 can trigger a new attack simulation that generates new attack simulation data items, such as new attack step data items.

Stage 430 can also be followed by stage 450 of responding to prioritized security events in response to contextual information associated with an attack attempt.

Stage 420 can include determining correlation between a simulation data item and event data by comparing between key fields of the simulation data item and corresponding key field of event data.

Method 400 can also include stage 460 of defining field based correlation rules and specific simulated event correlation rules. These rules are responsive to the outcome of stage 410. These rules can be applied during stage 420.

According to an embodiment of the invention, once these rules are defined, stage 410 can be skipped and stage 420 can include identifying security events in response to a correlation between correlation rules and event data.

Method 400 can include obtaining network address translation information and applying the network translation information during at least one stage out of the generating and the identifying.

Method 400 also includes stage 480 of updating at least one correlation or prioritization rule in response to attack simulation information.

It is noted that method 400 can be included in method 8 of FIG. 1. Especially, stage 410 can be included in stage 40, stages 420 and 430 can be included in stage 80 and stage 450 can be included in stage 100.

Figure 5:
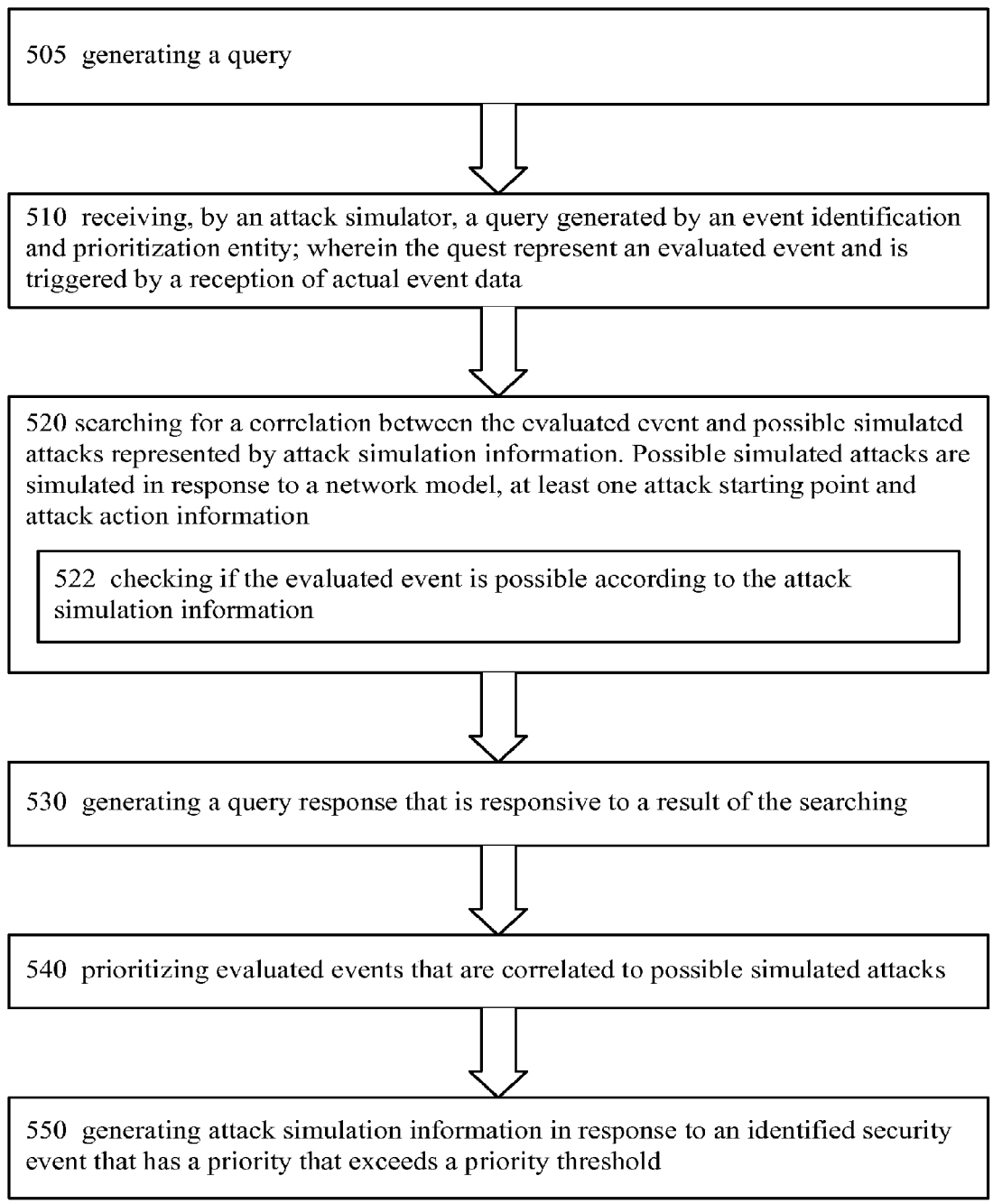
FIG. 5 is a flow chart of a method according to an embodiment of the invention.

FIG. 5 is a flow chart of method 500 according to an embodiment of the invention.

Method 500 starts by stage 510 of receiving, by an attack simulator, a query generated by an event identification and prioritization entity; wherein the quest represent an evaluated event and is triggered by a reception of actual event data.

Stage 510 is followed by stage 520 of searching for a correlation between the evaluated event and possible simulated attacks represented by attack simulation information. Possible simulated attacks are simulated in response to a network model, at least one attack starting point and attack action information.

Stage 520 is followed by stage 530 of generating a query response that is responsive to a result of the searching.

Stage 530 is followed by stage 540 of prioritizing evaluated events that are correlated to possible simulated attacks.

Stage 520 can include stage 522 of checking if the evaluated event is possible according to the attack simulation information.

Stage 510 can include receiving a query that includes evaluated event vulnerability exploitation information, evaluated event source address and evaluated event destination address and stage 530 can include generating a query response that comprises a likelihood of an occurrence of the evaluated event and a risk associated with the evaluated event.

Stage 510 can be preceded by stage 505 of generating the query. The query can be generated in response to a type of an evaluated event. Thus, when the security event manager detects a security event of a predefined type then the query is triggered.

Stage 540 can be followed by stage 550 of generating attack simulation information in response to an identified security event that has a priority that exceeds a priority threshold.

It is noted that method 500 can be included in method 8 of FIG. 1. Especially, stage 510 is represented by a dashed arrow between stage 80 and 70, stage 520 can be included in stage 70; stage 530 is represented by an arrow from stage 70 to stage 80; stage 540 can be included in stage 80.

Figure 6:
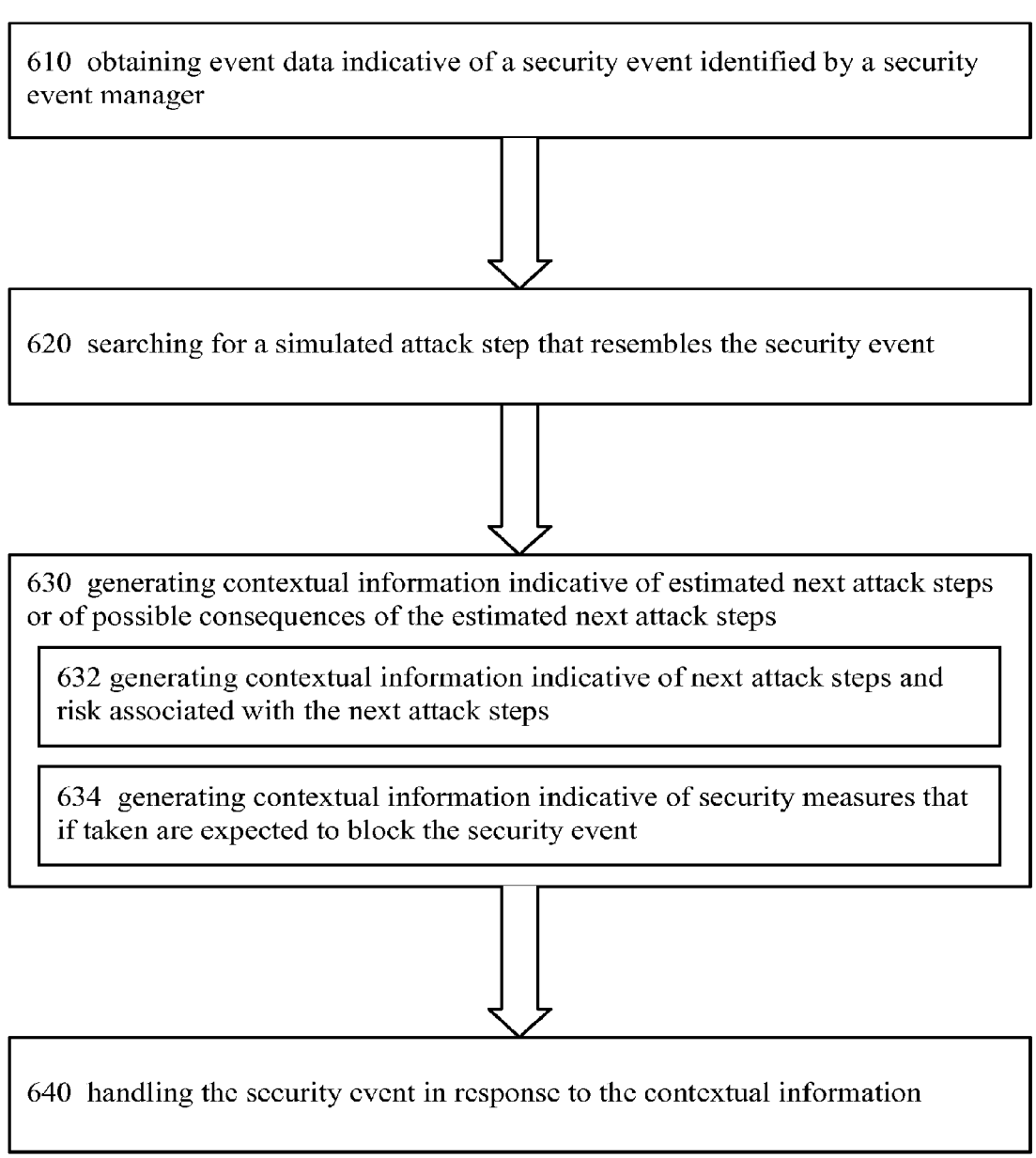
FIG. 6 is a flow chart of a method according to an embodiment of the invention.

FIG. 6 is a flow chart of method 600 according to an embodiment of the invention.

Method 600 starts by stage 610 of obtaining event data indicative of a security event identified by a security event manager.

Stage 610 is followed by stage 620 of searching for a simulated attack step that resembles the security event.

Stage 620 is followed by stage 630 of generating contextual information indicative of estimated next attack steps or of possible consequences of the estimated next attack steps.

Stage 630 is followed by stage 640 of handling the security event in response to the contextual information.

Stage 630 can include stage 632 of generating contextual information indicative of next attack steps and risk associated with the next attack steps.

Stage 630 can include stage 634 of generating contextual information indicative of security measures that if taken are expected to block the security event.

It is noted that method 600 can be included in method 8 of FIG. 1. Especially, stage 610 can be included in stage 60, stage 620 can be included in stage 80, stage 630 can be included in stage 90 and stage 640 can be included in stage 100.

FIG. 7 is a flow chart of method 700 according to an embodiment of the invention.

Method 700 starts by stages 710 and 720. Stage 710 includes obtaining event data indicative of a security event identified by a security event manager.

Stage 720 includes defining correlation rules based upon an outcome of an attack simulation. Stage 720 can include stage 422 of defining field based correlation rules and specific simulated event correlation rules. Field based correlation rules can define which fields of correlation rules and event data to compare, how to correlate these fields and the expected correlation results (including which result will be regarded as a correlation indicative result. Specific simulated event rules are more detailed and can specifically define a security event.

Stages 710 and 720 are followed by stage 730 of identifying security events in response to a correlation between correlation rules and event data. Stage 730 can include identifying security events in response to a correlation between field based correlation rules and specific simulated event correlation rules and event data.

Stage 730 can include prioritizing identified security events. It is noted that the confidence and priority of identified events can be defined in advance—when the correlation rules and especially the simulated event correlation rules are defined. Thus, one a match is found—the pre-defined confidence and the priority can be used.

Method 700 can include additional stage of method 400.

Each method out of methods 8, 400, 500, 600 and 700 can include at least one additional stage such as printing an outcome of the method, printing a report indicative of identified events, prioritized events, contextual information or a combination thereof.

Each method out of methods 8, 400, 500, 600 and 700 can include at least one additional stage such as changing a configuration of a computer or of a network element in response to prioritized and/or identified events. The changing of configuration can include changing definitions as well as changing the physical configuration of a computer or a network element. For example, changing the configuration of a firewall or IPS to block potential malicious activity from an attacked host, or even turning off or disconnecting a host at risk Conveniently, each of the mentioned above methods or a combination thereof can be executed by one or multiple computers. In case of multiple computers the multiple computes are expected to communicate with each other. Each computer can execute one or multiple stages of one or multiple methods by executing code stored in a computer readable medium that can be included in a computer program product.

A computer program product is provided. It includes a computer readable medium that stores instructions for generating attack simulation information that comprises multiple simulation data items of at least one data item type out of vulnerability instances data items, attack step data items and attack simulation scope data items; wherein the generating of attack simulation information is responsive to a network model, at least one attack starting point and attack action information; identifying security events in response to a correlation between simulation data items and event data; and prioritizing identified security events.

A computer program product is provided. It includes a computer readable medium that stores instructions for receiving, by an attack simulator, a query generated by an event identification and prioritization entity; wherein the quest represent an evaluated event and is triggered by a reception of actual event data; searching for a correlation between the evaluated event and possible simulated attacks represented by attack simulation information; wherein possible simulated attacks are simulated in response to a network model, at least one attack starting point and attack action information; generating a query response that is responsive to a result of the searching; and prioritizing evaluated events that are correlated to possible simulated attacks.

A computer program product is provided. It includes a computer readable medium that stores instructions for obtaining event data indicative of a security event identified by a security event manager; searching for a simulated attack step that resembles the security event; and generating contextual information indicative of estimated next attack steps or of possible consequences of the estimated next attack steps.

A computer program product is provided. It includes a computer readable medium that stores instructions for obtaining event data indicative of a security event identified by a security event manager; defining correlation rules based upon an outcome of an attack simulation; identifying security events in response to a correlation between correlation rules and event data; and prioritizing identified security events.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

We claim:

1. A method for simulation aided security event management, the method comprises: generating and storing attack simulation information that comprises multiple simulation data items of at least one data item type out of vulnerability instances data items, attack step data items and attack simulation scope data items; wherein the generating of the attack simulation information is responsive to a network model, at least one attack starting point and attack action information; identifying security events in response to a correlation between simulation data items and event data; determining a confidence level for each of the identified security events; prioritizing the identified security events that have a confidence level that is above a confidence threshold while ignoring the identified security events that have a confidence level that is below the confidence threshold.

2. The method according to claim 1 comprising generating, by a first computer, attack simulation information; and identifying security events, by a second computer, in response to the attack simulation information and to actual network event information.

3. The method according to claim 1 comprising determining a correlation between a simulation data item and event data by comparing between key fields of the simulation data item and corresponding key fields of the event data.

4. The method according to claim 1 comprising defining field based correlation rules and specific simulated event correlation rules; and applying the correlation rules and specific simulated event correlation rules during the identifying of the security events.

5. A method for simulation aided security event management, the method comprises: generating a new attack starting point or updating an existing attack starting point in response to an identified security event that has a priority that exceeds a priority threshold; wherein security events are identified in response to a correlation between simulation data items and event data; determining a priority level for each of the identified security events; ignoring the identified security events that have a priority level below the priority threshold, while prioritizing the identified security events that have a priority level exceeds the priority threshold; running an attack simulation which is based on a network model using the new attack starting point; storing attack simulation results; and analyzing risk and extracting contextual information.

6. A non-transitory computer readable medium that stores instructions for generating attack simulation information that comprises multiple simulation data items of at least one data item type out of vulnerability instances data items, attack step data items and attack simulation scope data items; wherein the generating of attack simulation information is responsive to a network model, at least one attack starting point and attack action information; identifying security events in response to a correlation between simulation data items and event data; determining a confidence level for each of the identified security events; prioritizing the identified security events that have a confidence level that is above a confidence threshold while ignoring the identified security events that have a confidence level that is below the confidence threshold.

7. The non-transitory computer readable medium according to claim 6, storing instructions for assigning a first confidence level to an identified event that is associated with a directly exposed vulnerability; assigning a second confidence level to an identified event that is associated with an indirectly exposed vulnerability; and assigning a third confidence level to an identified event that is associated with an inaccessible vulnerability; wherein the second confidence level is lower than the first confidence level and higher than the third confidence level.

8. The non-transitory computer readable medium according to claim 6, storing instructions for obtaining network address translation information and applying the network translation information during correlating between IP addresses appear in simulation data items and events.

9. The non-transitory computer readable medium according to claim 6, storing instructions for automatically generating rules for the security event management (SEM), where the rules represent attack simulation knowledge.

10. The non-transitory computer readable medium according to claim 9, wherein the rules for the SEM comprise rules for identifying exploitation of vulnerabilities that were found by the attack simulation knowledge to be risky.

11. The non-transitory computer readable medium according to claim 10, wherein the rules for the SEM comprise an IP address of a target node, a target port, and a source of attack steps.

12. The non-transitory computer readable medium according to claim 6, storing instructions for generating, by a first computer, attack simulation information; and identifying security events, by a second computer, in response to the attack simulation information and to actual network event information.

13. The non-transitory computer readable medium according to claim 6, storing instructions for determining a correlation between a simulation data item and event data by comparing between key fields of the simulation data item and corresponding key fields of the event data.

14. The non-transitory computer readable medium according to claim 6, storing instructions for defining field based correlation rules and specific simulated event correlation rules; and applying the correlation rules and specific simulated event correlation rules during the identifying of the security events.

15. A non-transitory computer readable medium that stores instructions for generating a new attack starting point or updating an existing attack starting point in response to an identified security event that has a priority that exceeds a priority threshold; wherein security events are identified in response to a correlation between simulation data items and event data; determining a priority level for each of the identified security events; ignoring the identified security events that have a priority level below the priority threshold, while prioritizing the identified security events that have a priority level exceeds the priority threshold; running an attack simulation which is based on a network model using the new attack starting point; and analyzing risk and extracting contextual information.

16. The non-transitory computer readable medium according to claim 15, storing instructions for extracting contextual information that relates to a next possible attack steps of an attacker from an event target node.

17. The non-transitory computer readable medium according to claim 15, storing instructions for extracting contextual information that relates to a next possible attack steps of an attacker from an event source node.

18. The non-transitory computer readable medium according to claim 15, storing instructions for extracting contextual information that relates to security counter-measures that can be used for blocking possible next attack steps.

\* \* \* \* \*